J. W. FITZ GERALD.
SPRING SEAT CONSTRUCTION.
APPLICATION FILED JUNE 16, 1919.
1,330,938.
Patented Feb. 17, 1920.
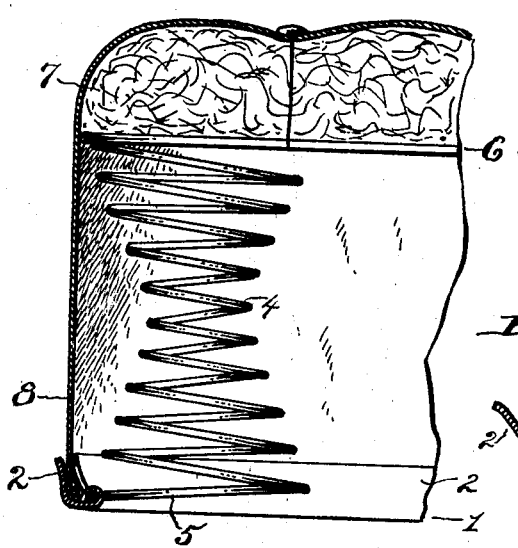
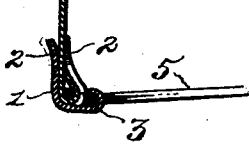
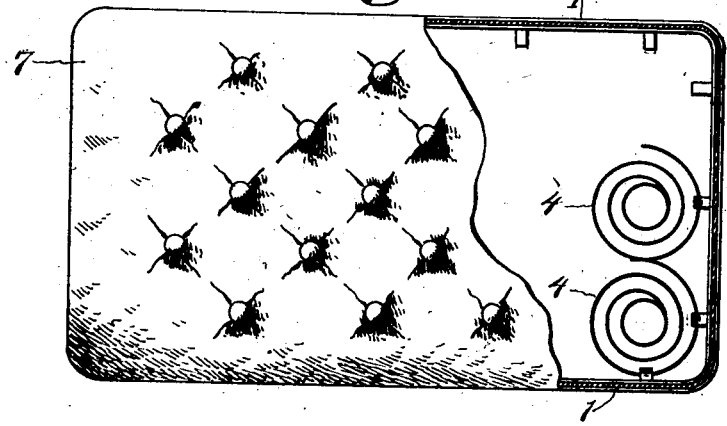
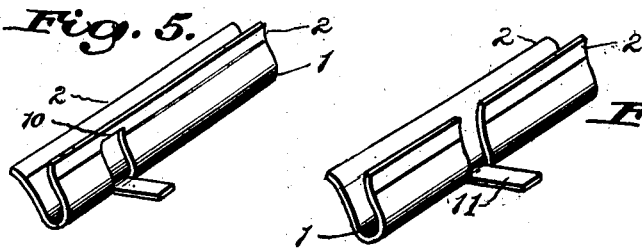
INVENTOR
John W. Fitz Gerald
BY
Clement R. Stickney
ATTORNEY

UNITED STATES PATENT OFFICE.

JOHN W. FITZ GERALD, OF DETROIT, MICHIGAN.

SPRING-SEAT CONSTRUCTION.

1,330,938.  Specification of Letters Patent.  Patented Feb. 17, 1920.

Application filed June 16, 1919. Serial No. 304,511.

*To all whom it may concern:*

Be it known that I, JOHN W. FITZ GERALD, a citizen of the United States, residing at Detroit, in the county of Wayne and State of Michigan, have invented certain new and useful Improvements in Spring-Seat Construction, of which the following is a specification.

In the manufacture of spring seats, particularly those for use in automobile vehicles that have to withstand considerable hard usage due to the violent shocks that the vehicles encounter, it is necessary to provide a rigid support frame and at the same time, where this frame is made of metal to secure the apron of applied upholstery to the base in such a manner that the seat has a neat appearance, while it is also advisable to minimize the number of parts used, not only to lower the expensive construction but also to avoid the likelihood of numerous parts coming loose under usage.

This invention relates to spring seat construction and more particularly to an arrangement of the base or rim frame whereby adequate provision is made for giving the necessary strength to the structure and for neatly and firmly securing the apron of the upholstery in position.

This invention consists in the matters hereinafter set forth, and more particularly pointed out in the appended claim.

In the drawings:

Figure 1 is a plan view, partially broken away and in section, of a seat embodying features of the invention;

Fig. 2 is a view in transverse upright section through a portion of the seat;

Fig. 3 is a view in detail of a base strip before the application of the upholstery apron and the spring;

Fig. 4 is a view in detail showing the strip with the spring and upholstery secured thereto;

Fig. 5 is a view in detail of one form of strip;

Fig. 6 is a view in detail of a slight modification thereof.

Referring to the drawings, a base rim is formed of members 1 each consisting of a sheet metal strip bent into substantially U-strip section with the margins 2 thereof, if desired, slightly rolled.

At intervals, tongues 3 are struck out from the flanges of the strip, the base of each tongue merging into the strip at the place of greatest or most acute bend thereof between the flanges and being disposed at such an angle to the cross axis of the strip that when the parts are assembled, the U-strip stands in an obliquely upright position whereby the flanges oppose any bending against vertical loads.

The body springs 4 are secured to the strip 1, each having the base turn 5 thereof resting on a tongue 3, the latter being folded around the spring to retain it and the downward thrust of the spring acting to assist in maintaining the U-strip in its upright position. Interconnection between the body springs is had by any desirable means and an upper rim 6 is supported thereon.

Applied upholstery 7 rests on the springs, and the depending apron 8 thereof has its welted or hemmed portion inserted in the U-strip which is then clenched against it as by the use of pliers or a suitable air hammer. As indicated in Fig. 3 the strip is arranged as shown before the insertion of the strip and spring; when clenched to hold the spring and welt the strip assumes the relative shape generally shown in Fig. 4.

The tongues 3, as indicated in Fig. 5, may be struck out from the body of the strip so as to leave a marginal part 10 spanning the opening formed by the withdrawal of the tongue, or as indicated in Fig. 6, tongues 11 may be formed without leaving any portions across the openings at the margin thereof.

One feature of the construction is the rigidity afforded by the obliquely upright position of the U-strip flanges, substantially the entire depth of the U-strip being utilized to resist any bending by a load upon the seat.

Another feature is the location of the spring-retaining tongues which aids in maintaining the strips in upright position, the tongues having the load of the spring imposed in one direction and the strain of the welt pulling against the strip in opposite direction so that the strip normally tends to maintain its position, although where the corners of the spring frame are rounded as indicated in Fig. 1 the U-strip maintains its position without any tendency to rotate on its longitudinal axis.

Obviously changes in the details of construction may be made without departing from the spirit of the invention and I do not care to limit myself to any particular form or arrangement of parts.

I claim:—

In a spring seat construction, a base frame having a marginal U-strip disposed with the flanges thereof extending obliquely upward, tongues struck from the inner flange with the roots thereof merging into the strip at the point of greatest bend of the strip and forming locating means whereby the strip, when supported on a plane surface, rests in the desired position, upright body springs on the base frame secured against the inner flanges of the strips by inbent portions of the tongues and upholstery on the springs including a depending apron, the lower marginal portion of which is inserted between and gripped by the flanges of the U strip.

In testimony whereof I affix my signature.

JOHN W. FITZ GERALD.